United States Patent [19]

Preston et al.

[11] 4,186,824
[45] Feb. 5, 1980

[54] ANTI-RATTLE SPRING FOR DISC BRAKE

[75] Inventors: Gary W. Preston; Donald D. Johannesen; William J. Kestermeier, all of South Bend, Ind.

[73] Assignee: The Bendix Corporation, Southfield, Mich.

[21] Appl. No.: 914,475

[22] Filed: Jun. 12, 1978

[51] Int. Cl.$^2$ ............................................. F16D 65/02
[52] U.S. Cl. ................................ 188/73.5; 188/73.6; 192/30 V
[58] Field of Search ................ 188/73.3, 73.5, 73.6; 192/30 V

[56] References Cited

U.S. PATENT DOCUMENTS

| 3,189,129 | 6/1965 | Burnett | 188/73.6 |
| 3,387,687 | 6/1968 | Eggstein et al. | 188/73.3 X |
| 3,677,372 | 7/1972 | Burnett | 188/205 A X |
| 3,998,296 | 12/1976 | James | 188/73.5 |

FOREIGN PATENT DOCUMENTS 1398713   6/1975   United Kingdom ................... 188/73.6

*Primary Examiner*—George E. A. Halvosa
*Attorney, Agent, or Firm*—Paul David Schoenle; Ken C. Decker

[57] ABSTRACT

A disc brake includes a pair of friction elements which are movable by a hydraulic actuator and a caliper into engagement with the disc to effectuate braking. A torque member movably supports the caliper. The hydraulic actuator includes a piston cup and an anti-rattle spring is disposed within the piston cup and releasably engaged with one of the pair of friction elements to eliminate noise generated between the one friction element and the caliper, the torque member, or the piston cup. In particular, the anti-rattle spring comprises a split ring having a polygonal circumference. The split ring is contracted radially for insertion into the piston cup and sides of the polygonal surface are expanded radially to receive the one friction element. A pair of tabs on the split ring releasably engages the one friction element to retain the same in engagement with the piston cup.

1 Claim, 3 Drawing Figures

ANTI-RATTLE SPRING FOR DISC BRAKE

BACKGROUND OF THE INVENTION

Heretofore, disc brakes have been provided with anti-rattle springs to eliminate noise generated by the clanging of a friction element against a caliper, piston, or torque member, as illustrated in U.S. Pat. No. 4,082,166. These springs have required modification of the friction elements to provide for attachment of the springs or have complicated the assembly of the disc brake as the springs generally bias the pair of friction elements into engagement with the caliper.

SUMMARY OF THE INVENTION

The present invention relates to an improved anti-rattle spring for eliminating noise between a torque member, a caliper, or a piston, and one of the friction elements. The anti-rattle spring herein comprises a polygonal split ring which is radially contracted for insertion into a piston cup of a hydraulic actuator. One side of the polygonal split ring includes a first tab which releasably engages the one friction element, as the one side is radially expanded. A second tab is oppositely disposed from the first tab and is cooperating with the first tab to releasably engage the one friction element so as to retain the latter in engagement with the piston cup.

It is an object of the present invention to provide an anti-rattle spring which is easily integrated into an existing disc brake assembly without any, or with very little, modification of the existing disc brake.

In particular, it is a primary object of the present invention to provide an anti-rattle spring which eliminates objectionable noise generated by movement of a friction element in a vibration mode between a friction element caliper, piston, or a torque member on a disc brake.

In addition, it is an important object of the present invention to provide an anti-rattle spring which does not generate any force tending to separate a friction element from a piston which is engageable therewith.

DETAILED DESCRIPTION

Figure 1:
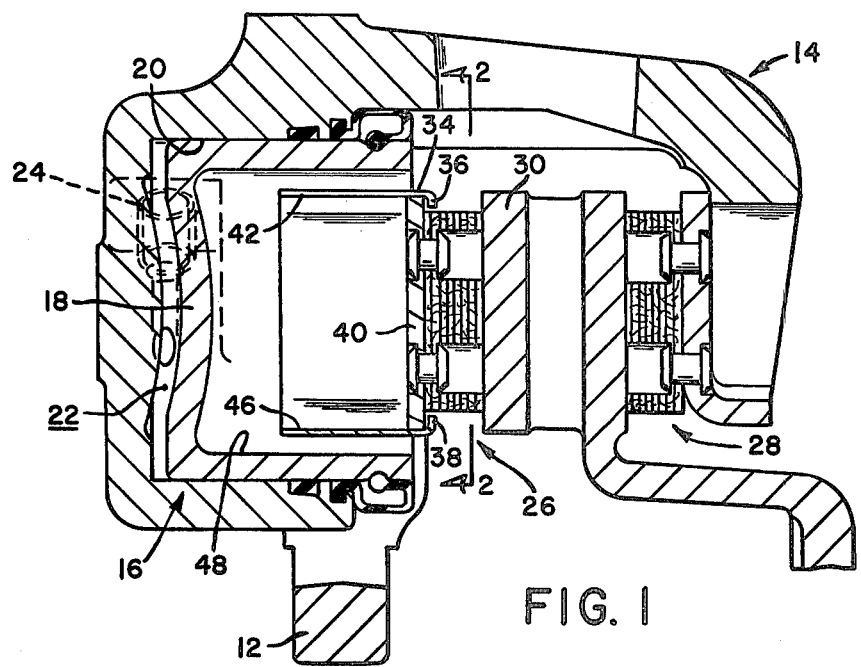
FIG. 1 is a cross-sectional view of a disc brake constructed in accordance with the present invention.

The disc brake illustrated in FIg. 1 is generally referred to by reference numeral 10. A torque member 12 is securely fastened to a non-rotating portion of an axle assembly (not shown). The torque member slidably supports a caliper 14 which carries a hydraulic actuator 16 in the form of a piston cup 18. The piston cup is slidably mounted in a bore 20 on the caliper to substantially define a pressure chamber 22 which communicates via port 24 with a pressure source, such as a master cylinder (not shown).

Figure 2:
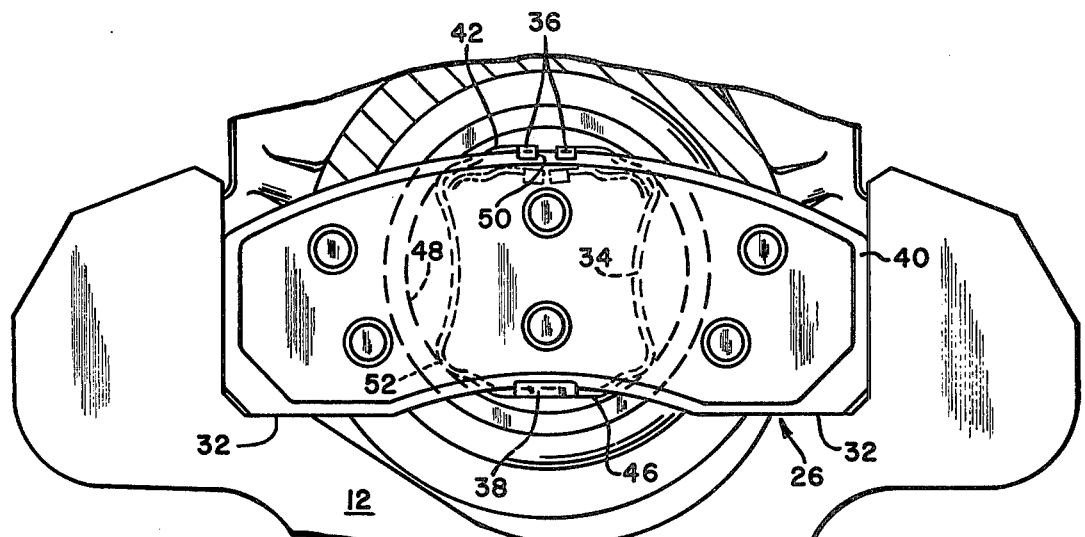
FIG. 2 is a right side view of the disc brake of FIG. 1 taken along line 2—2 of FIG. 1.

As is well known in the art, the caliper straddles a pair of friction elements 26 and 28 which are disposed on opposite sides of a rotor 30 connected to a rotating portion of the axle assembly. Turning to FIG. 2, it is seen that the torque member 12 includes a pair of shoulders at 32 for supporting the friction elements 26.

In accordance with the invention, a resilient member 34 comprises an anti-rattle spring for attachment with the inner friction element 26. The spring is disposed within the piston cup 18 and is provided with a pair of tabs 36 at the top and a single tab 38 at the bottom. The tabs cooperate with the friction element 26 to releasably engage a backing plate 40 included with the friction element 26.

Figure 3:
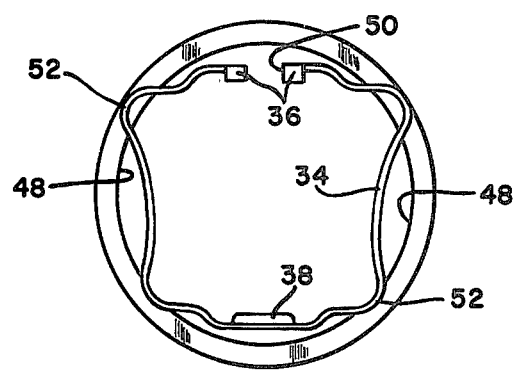
FIG. 3 is a view of the anti-rattle spring shown in FIG. 1 when the anti-rattle spring is separate from the disc brake.

Viewing FIGS. 2 and 3, the spring 34 includes a polygonal circumference with the tabs 36 being disposed on a top side 42 and the tab 38 being disposed on a bottom side 46 opposite the top side 42. The piston cup 18 includes a bore 48 for receiving the spring 34 and the latter is split at 50 near the tabs 36 so that the spring is radially contracted when inserted in the bore 48, as the diameter between opposite edges of the polygonal surface at 52 is larger than the diameter of the bore 48 when the spring is in its rest position shown in FIG. 3. Consequently, when installed the spring 34 is radially expanded to frictionally engage the edges of the polygonal circumference with the bore 48. With the spring 34 inserted in the bore 48, the side 42 of the polygonal circumference is in the position shown in phantom in FIG. 2. Therefore, to attach the backing plate 40 to the spring 34, or vice versa, the sides 42 and 46 must be radially expanded to enable the tabs 36 and 38 to releasably interlock with the backing plate when the spring is disposed in the bore. Moreover, the frictional engagement between the bore 48 and the spring 34 opposes separation of the friction element 26 from the piston cup 18.

When the caliper is attached to the torque member 12, the friction element 26 is brought into abutment with the torque member shoulders 32. In the assembled position, the friction element 26 will be shifted vertically upward, viewing FIG. 2, by the abutment with the shoulders 32.

The tabs 36 and 38 engage the backing plate 40 so that the plate 40 is prevented from separating from the piston cup 18, after brakling is terminated and the friction element 26 is slightly spaced from the disc 30.

With the foregoing description, it is seen that the anti-rattle spring 34 is easily adapted for use with the disc brake 10 without any changes or modifications, or with very few changes modifications, to the piston cup 18 or the friction element 26.

Many variations and/or modifications of the anti-rattle spring 34 are possible by those skilled in the art and it is intended that these variations and/or modifications are included within the scope of the present invention as defined by the appended claims.

We claim:

1. In a disc brake assembly having a torque member which movably supports a caliper and a pair of friction elements, the caliper cooperating with a piston cup to define a pressure chamber, the piston cup defining a bore opposite the pressure chamber, a resilient member carried within said piston cup bore and cooperating with one of said pair of friction elements to substantially eliminate rattle generated by said one friction element, said resilient member forming a split which permits radial contraction of said resilient member for insertion thereof into said piston cup bore, said resilient member including at least one tab adjacent said split, said one tab extending axially outwardly from said piston cup bore, and said resilient member including another tab extending axially outwardly from said piston cup bore substantially diametrically opposite said one tab relative to said piston cup bore, said tabs having radially extending facing portions, said one and other tabs cooperating with each other to expand radially after said resilient member is inserted in said piston cup bore to releasably engage and retain said one friction element therebetween in engagement with said piston cup.

* * * * *